United States Patent
Glugla et al.

(10) Patent No.: US 9,534,530 B2
(45) Date of Patent: Jan. 3, 2017

(54) DEDICATED-EGR CYLINDER WITH VARIABLE CHARGE MOTION

(71) Applicant: Ford Global Technologies, LLC, Dearborn, MI (US)

(72) Inventors: Chris Paul Glugla, Macomb, MI (US); Daniel Joseph Styles, Canton, MI (US); Michael Damian Czekala, Canton, MI (US); James Alfred Hilditch, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 14/454,275

(22) Filed: Aug. 7, 2014

(65) Prior Publication Data

US 2016/0040589 A1    Feb. 11, 2016

(51) Int. Cl.
*F02D 41/00* (2006.01)
*F02B 31/06* (2006.01)
(Continued)

(52) U.S. Cl.
CPC ............ *F02B 31/06* (2013.01); *F02D 41/0002* (2013.01); *F02D 41/005* (2013.01); *F02D 41/008* (2013.01); *F02D 41/0065* (2013.01); *F02D 41/0077* (2013.01); *F02D 41/0082* (2013.01); *F02M 25/0749* (2013.01); *F02M 26/43* (2016.02); *F02B 2075/125* (2013.01); *F02B 2275/48* (2013.01); *F02D 2041/0015* (2013.01);
(Continued)

(58) Field of Classification Search
CPC  F02D 41/0077; F02D 41/0065; F02D 41/008; F02D 41/0082; F02B 31/06

USPC .......... 123/568.11, 568.21; 701/108; 60/278, 60/298
See application file for complete search history.

(56) References Cited

U.S. PATENT DOCUMENTS 6,138,650 A    10/2000 Bailey
6,543,230 B1    4/2003 Schmid
(Continued)

FOREIGN PATENT DOCUMENTS

JP    2013160062 A  *  8/2013

OTHER PUBLICATIONS

Alger, Terry et al., "Dedicated EGR: A New Concept in High Efficiency Engines," SAE Technical Paper Series No. 2009-01-0694, Southwest Research Institute, 12 pages.
(Continued)

*Primary Examiner* — Mahmoud Gimie
(74) *Attorney, Agent, or Firm* — Julia Voutyras; Alleman Hall McCoy Russell & Tuttle LLP

(57) ABSTRACT

Methods and systems are provided for adjusting charge motion control devices coupled to a series of cylinders organized into cylinder groups, one of the cylinder groups including a dedicated EGR cylinder group wherein the cylinders are the only engine cylinder routing exhaust to an engine intake. In one example, a first cylinder group may be a dedicated cylinder group recirculating exhaust to the intake manifold while a second cylinder group may be a non-dedicated cylinder group routing exhaust to a turbine. A method may include adjusting a first charge motion control device coupled to the first cylinder group and a second charge motion control device coupled to the second cylinder group to vary a charge motion level between the first and second cylinder groups.

18 Claims, 7 Drawing Sheets

(51) Int. Cl.
*F02M 25/07* (2006.01)
*F02B 75/12* (2006.01)

(52) U.S. Cl.
CPC .............. *F02M 26/05* (2016.02); *Y02T 10/42* (2013.01); *Y02T 10/47* (2013.01)

(56) References Cited

U.S. PATENT DOCUMENTS

| | | |
|---|---|---|
| 6,715,476 B2 | 4/2004 | Gopp et al. |
| 7,287,492 B2 | 10/2007 | Leone et al. |
| 8,060,293 B2 | 11/2011 | Meyer et al. |
| 8,176,893 B2 | 5/2012 | Glugla et al. |
| 8,291,891 B2 | 10/2012 | Alger, II et al. |
| 8,539,768 B2 | 9/2013 | Hayman et al. |
| 8,561,599 B2 | 10/2013 | Gingrich et al. |
| 2004/0043864 A1* | 3/2004 | Hrovat .................. B60W 10/02 477/83 |
| 2004/0084015 A1* | 5/2004 | Sun ...................... F02D 35/0007 123/399 |
| 2009/0308070 A1 | 12/2009 | Alger, II et al. |
| 2012/0204844 A1 | 8/2012 | Gingrich et al. |
| 2012/0285163 A1 | 11/2012 | Hayman et al. |
| 2013/0220286 A1 | 8/2013 | Gingrich et al. |
| 2014/0142833 A1* | 5/2014 | Gingrich ............ F02D 41/0255 701/103 |
| 2014/0196703 A1 | 7/2014 | Boyer et al. |
| 2014/0230781 A1 | 8/2014 | Newman et al. |

OTHER PUBLICATIONS

Leone, Thomas G. et al., "Systems and Methods for EGR Control," U.S. Appl. No. 14/298,733, filed Jun. 6, 2014, 45 pages.

\* cited by examiner

| Engine Load | Non-DEGR Cylinders | DEGR Cylinders | DEGR mode |
|---|---|---|---|
| 401 → > Upper threshold | Low tumble ratio/charge motion level | Low tumble ratio/charge motion level | OFF |
| 402 → Between upper threshold and middle threshold | Low tumble ratio/charge motion level | Medium tumble ratio/charge motion level | ON |
| 403 → Between middle threshold and lower threshold | Medium tumble ratio/charge motion level | High tumble ratio/charge motion level | ON |
| 404 → < Lower threshold | High tumble ratio/charge motion level | Higher tumble ratio/charge motion level | ON but reduced (may also be off) |

DEDICATED-EGR CYLINDER WITH VARIABLE CHARGE MOTION

FIELD

The present description relates generally to methods and systems for adjusting charge motion in a group of dedicated engine cylinders providing external EGR to an engine intake and a group of non-dedicated engine cylinders.

BACKGROUND/SUMMARY

Engines may be configured with exhaust gas recirculation (EGR) systems to divert at least some exhaust gas from an engine exhaust manifold to an engine intake manifold. By providing a desired engine dilution, such systems reduce engine knock, throttling losses, in-cylinder heat losses, as well as NOx emissions. As a result, fuel economy is improved, especially at higher levels of engine boost. Engines have also been configured with a sole cylinder (or cylinder group) that is dedicated for providing external EGR to other engine cylinders. Therein, all of the exhaust from the dedicated cylinder group is recirculated to the intake manifold. As such, this allows a substantially fixed amount of EGR to be provided to engine cylinders at most operating conditions. By adjusting the fueling of the dedicated EGR cylinder group (e.g., to run rich), the EGR composition can be varied to include species such as Hydrogen which improve the EGR tolerance of the engine and resulting fuel economy benefits.

Additionally, increased motion of the air and/or fuel charge injected into an engine combustion chamber can increase combustion efficiency under some conditions. For example, charge motion can increase the effectiveness of combustion by introducing air velocity and turbulence in directions perpendicular to the flow direction. By introducing additional kinetic energy into the combustion chambers, the ignition front may traverse the volume of the combustion chamber more quickly and more evenly so as to interact with a heightened amount of fuel before thermal energy is translated to piston motion. Further, resulting turbulence may increase homogenization of the air-to-fuel mixture within the combustion chamber as well as increase the burn rate, which is the time required to for the air/fuel mixture to burn completely during the combustion process. In one example, charge motion control devices, such as charge motion control valves, may be coupled upstream of the intake of engine cylinders in order to increase or decrease the charge motion of a corresponding cylinder, thereby increasing or decreasing the cylinder burn rate, respectively.

In one method for utilizing charge motion control devices, shown by Gopp and Michelini in U.S. Pat. No. 6,715,476, a charge motion control valve or an intake manifold runner control (or similar device) selectively controls the incoming air or air/fuel charge. In one example, a charge motion control valve is placed in the runner associated with each cylinder and is operated by a controller via actuators attached to each respective valve. The actuators can be controlled independently or in a coordinated fashion depending on the particular application. Furthermore, an exhaust gas recirculation (EGR) circuit is provided with an EGR valve to selectively supply a portion of exhaust from an exhaust manifold to an intake manifold. In one embodiment, the EGR exhaust is shown being directed into the intake manifold upstream of where the charge motion control valve is located, such that during operation the air or air/fuel charge along with the EGR exhaust is directed through the charge motion control valve. In this way, determination of the desired EGR flow rate includes the position (open, closed) of the charge motion control valves, among other factors.

However, the inventors herein have recognized potential issues with this charge motion control device and approach. First, the charge motion control valve is described as being open or closed based on a command from the controller, where there is no discussion of the degrees of opening of the valve between the open and closed positions. A range of positions of the charge motion control valve may be desirable for achieving a variety of air-fuel ratios, tumble ratios, and burn rates for each cylinder depending on the engine operating conditions. Furthermore, the EGR system includes an EGR circuit for each cylinder, which directs a portion of exhaust from each cylinder back to the intake manifold. It may be desirable to route a variable amount of exhaust from only a single cylinder (or a dedicated group of cylinders) in order to enhance engine performance while providing more options for charge motion control and EGR.

In one example, the issues described above may be at least partially addressed by a method for an engine, comprising: adjusting each of a first charge motion control device coupled to a first cylinder group and a second charge motion control device coupled to a second cylinder group to vary a charge motion level between the first and second cylinder groups while recirculating exhaust from only the second cylinder group to an intake manifold. In this way, a range of desirable burn rates for the first and second cylinder groups can be achieved via a combination of adjustments of the first and second charge motion control devices and the exhaust gas recirculation from the first cylinder group.

In another example, exhaust from the EGR system can be selectively controlled in two modes; a non-dedicated EGR mode where no exhaust is recirculated into the intake manifold from the first cylinder group, and a dedicated EGR mode where exhaust is recirculated from only the first cylinder group to the intake manifold. During the non-dedicated EGR mode, the first and second charge motion control devices can be adjusted to maintain a common charge motion level between the two cylinder groups. During the dedicated EGR mode, the two charge motion control devices can be adjusted to vary the charge motion level between the two cylinder groups. Other configurations are possible, as discussed in more detail below.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a table of switching dedicated EGR modes and adjusting the charge motion level between the cylinder groups for different engine conditions.

DETAILED DESCRIPTION

Figure 1:
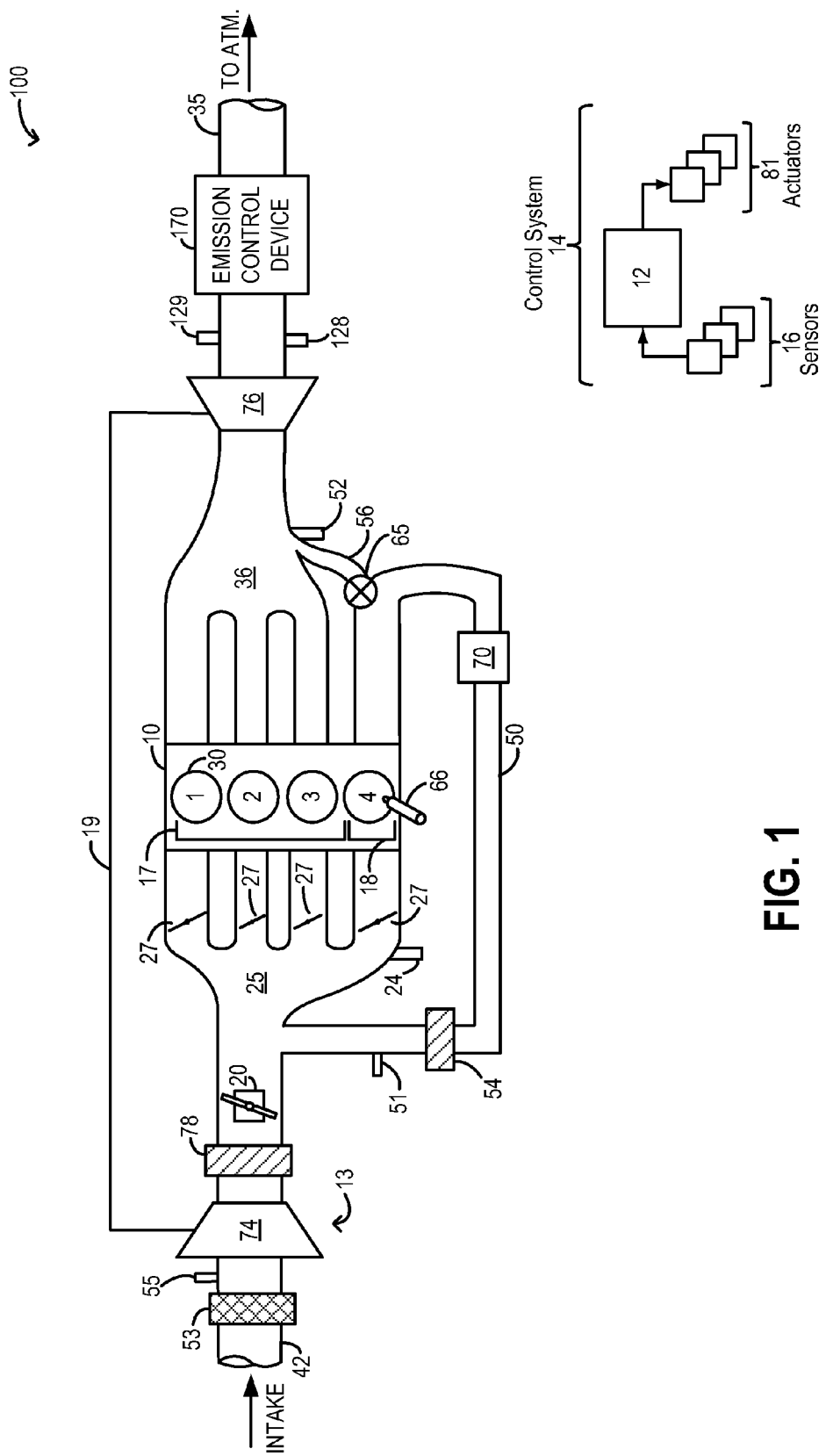
FIG. 1 is a schematic diagram of an engine system including a dedicated EGR donating cylinder group and a number of charge motion control devices.
Figure 2:
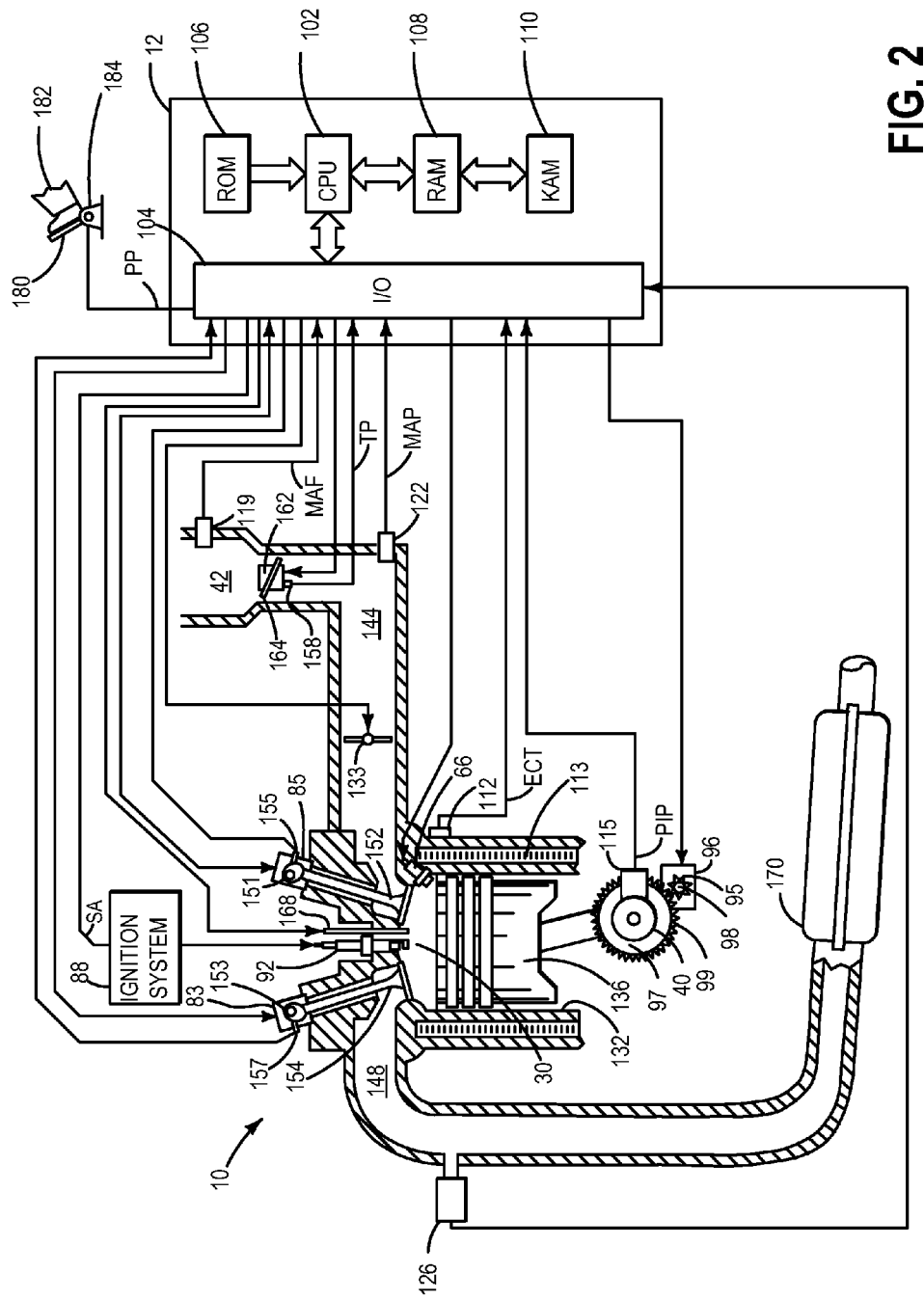
FIG. 2 is a schematic depiction of a combustion chamber of the engine system of FIG. 1.
Figure 3:
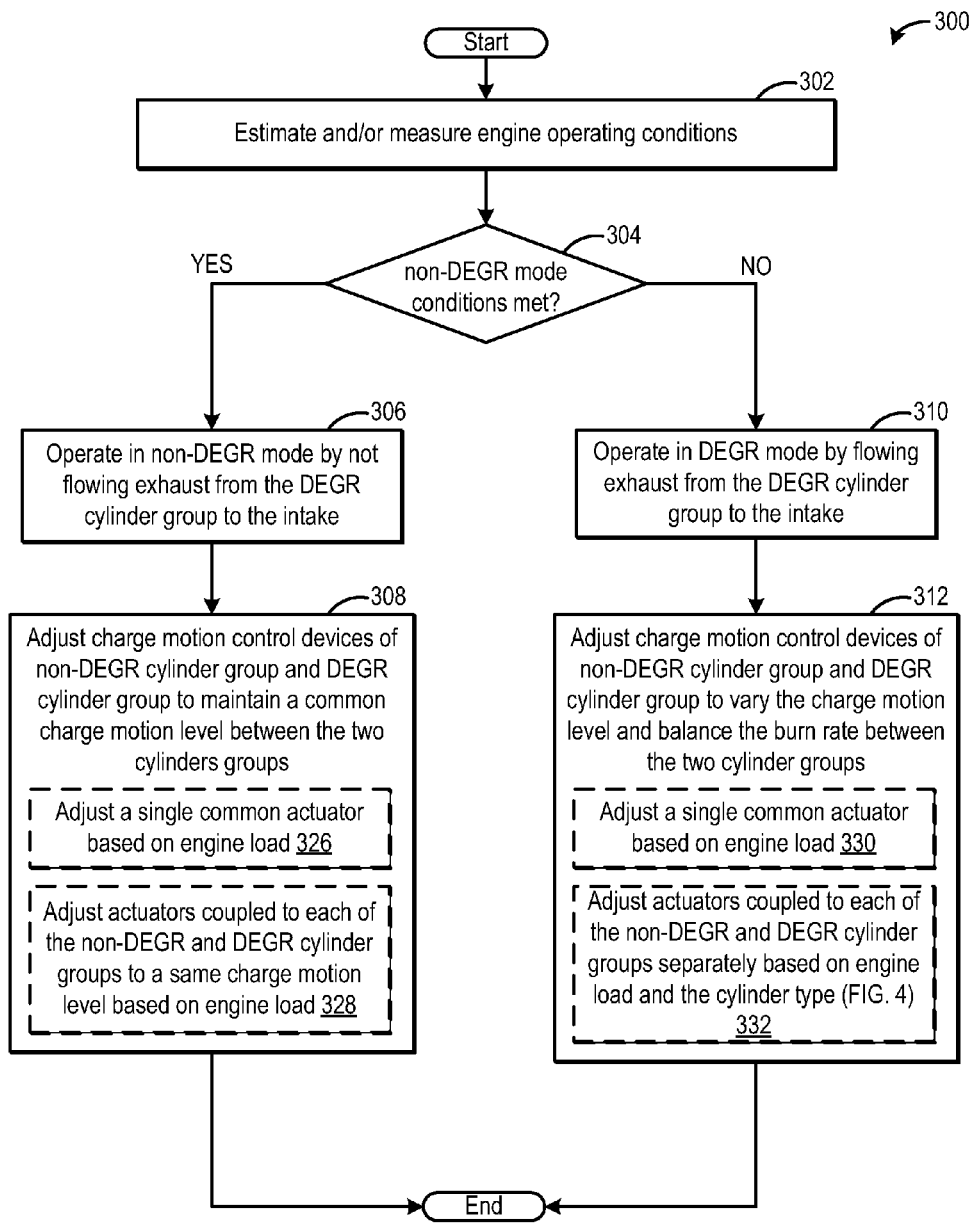
FIG. 3 shows an example method for adjusting operation of the engine system to vary EGR rate while adjusting one or more charge motion control devices.
Figure 5:
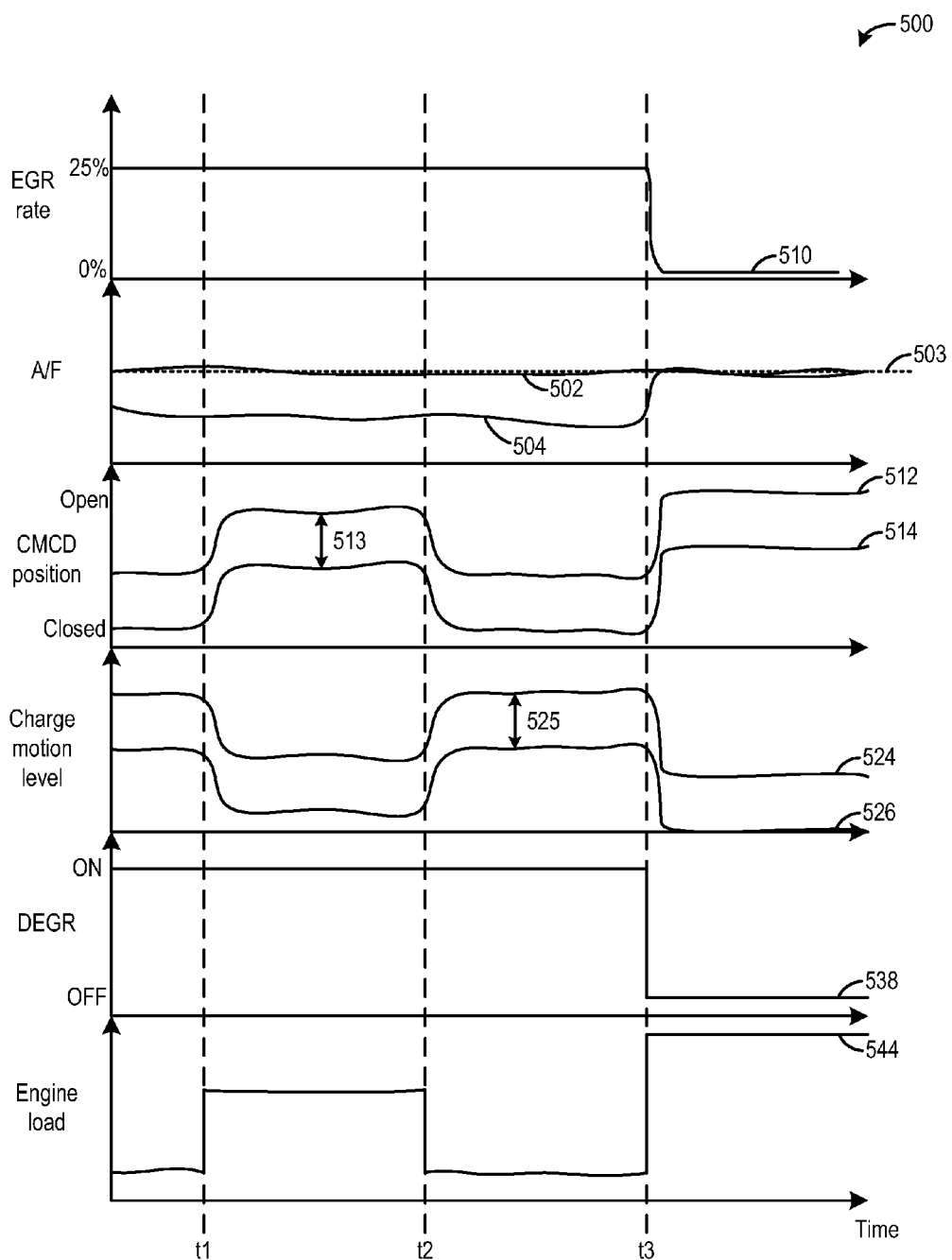
FIG. 5 shows a first example map of adjustment of several variables depending on an engine load throughout a period of time.
Figure 6:
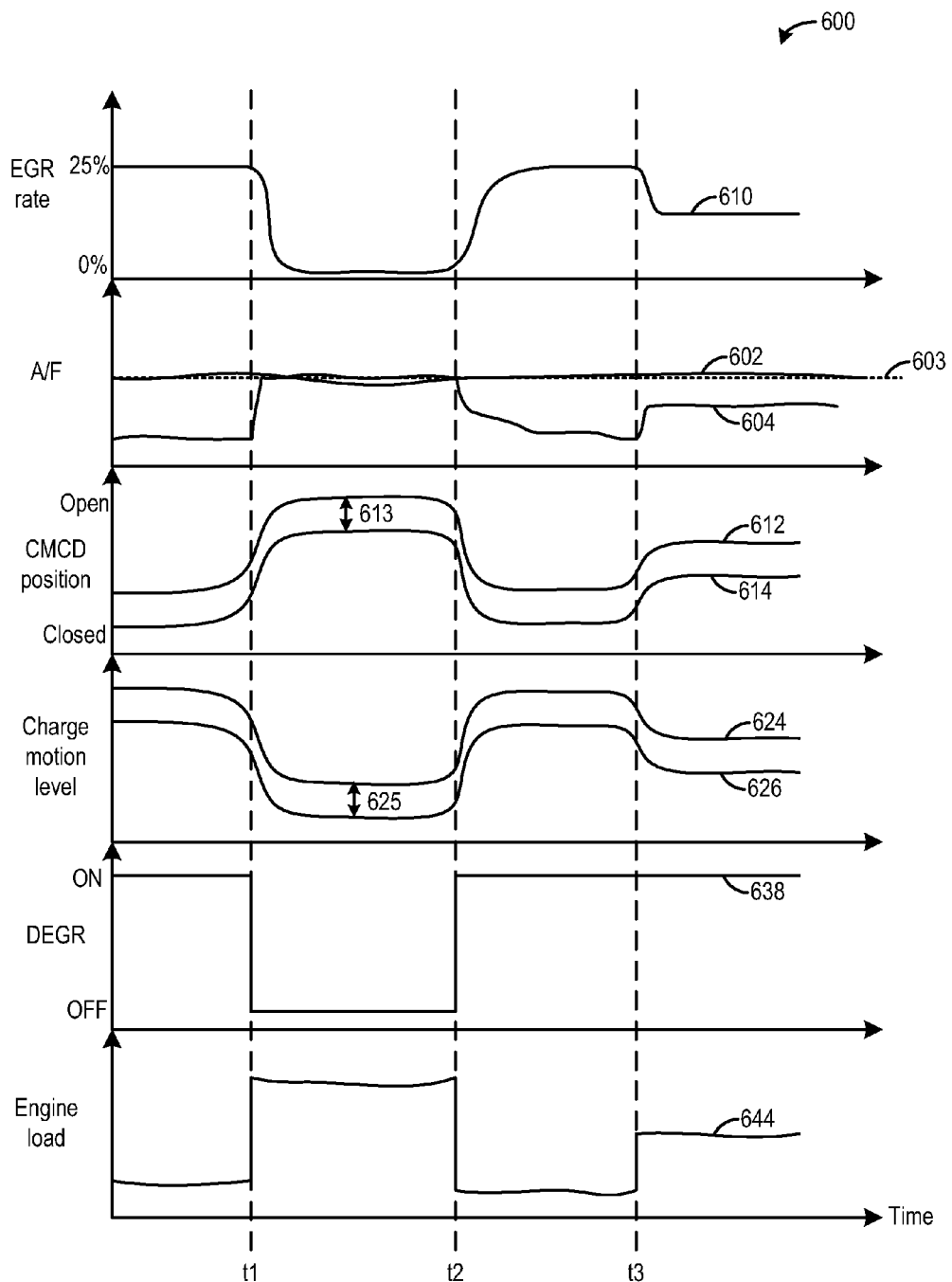
FIG. 6 shows a first second map of adjustment of several variables depending on an engine load throughout a period of time.
Figure 7:
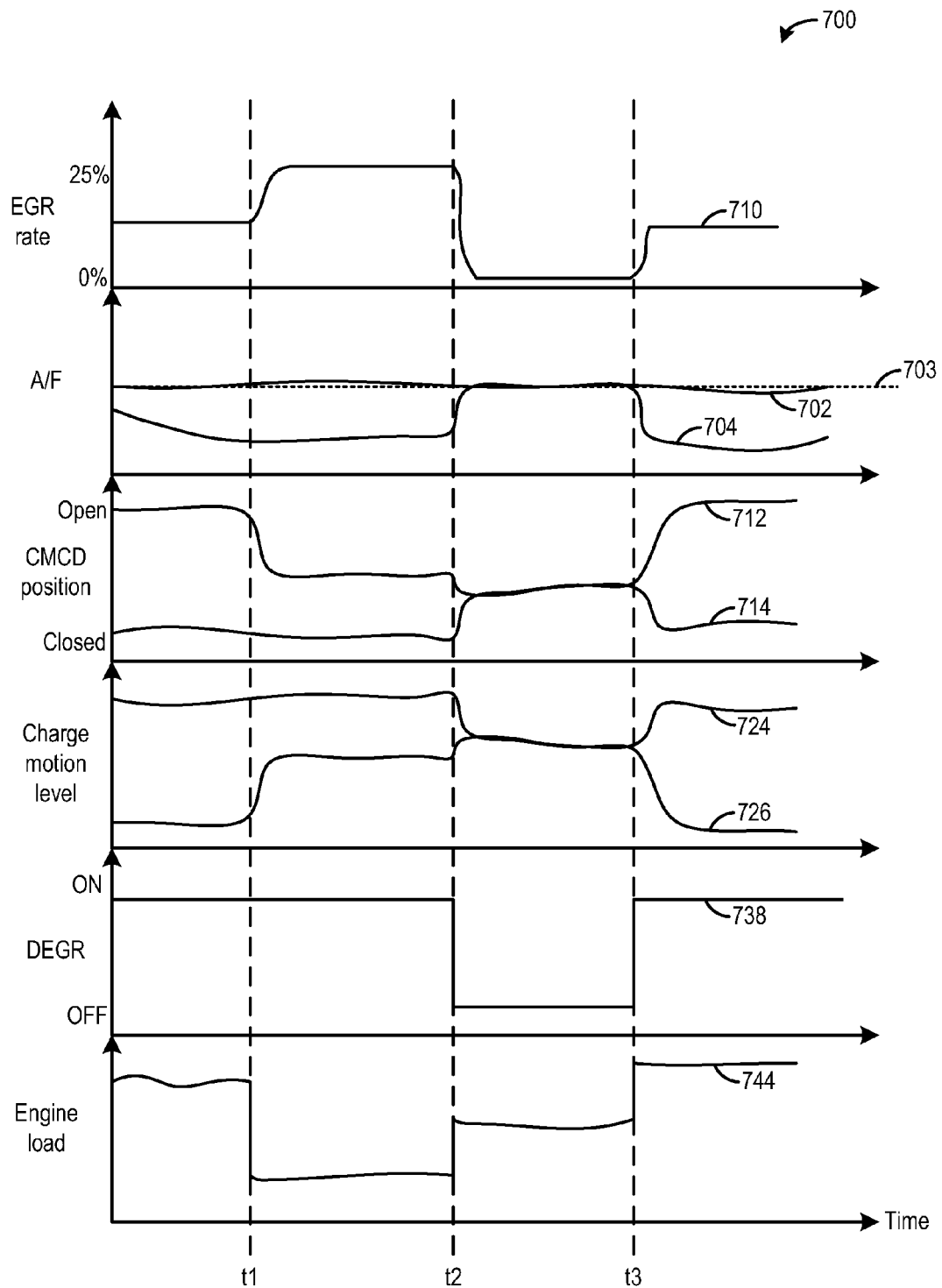
FIG. 7 shows a third example map of adjustment of several variables depending on an engine load throughout a period of time.

The following description relates to systems and methods for adjusting charge motion delivered to cylinders with and without coupling to a dedicated exhaust gas recirculation (EGR) system. FIG. 1 shows a schematic diagram of an engine system including a dedicated EGR donating cylinder group and a number of charge motion control devices while FIG. 2 shows a schematic depiction of a combustion chamber of the engine system of FIG. 1. FIG. 3 shows an example method for adjusting operation of the engine system to vary EGR rate while adjusting one or more charge motion control devices. FIG. 4 shows a table of switching dedicated EGR modes and adjusting the charge motion level between the cylinder groups for different engine conditions. Finally, FIGS. 5-7 show three example maps of adjusting several variables depending on an engine load throughout a period of time.

Increased motion of the air and/or fuel charge injected into an engine combustion chamber can increase combustion efficiency under some conditions. For example, charge motion can increase the effectiveness of combustion by introducing air velocity in directions perpendicular to the flow direction. By introducing additional kinetic energy into the combustion chambers, the ignition front may traverse the volume of the combustion chamber more quickly and more evenly so as to interact with a heightened amount of fuel before thermal energy is translated to piston motion. Further, resulting turbulence may increase homogenization of the air-to-fuel mixture within the combustion chamber.

Charge motion control valves (CMCV's) may be used to induce desired turbulence by restricting a portion of the intake passage within the intake manifold. Upon passing through this restriction, air is reflected from the far wall with a horizontal velocity as well as its initial vertical (flow-direction) velocity induced by a pressure differential in the intake system. CMCV's may be controlled by an actuator programmed to create this obstruction during certain, advantageous, operating conditions. In other examples, alternate mechanical devices may be used to adjust the air turbulence and charge motion of one or more engine cylinders.

In one example, CMCV's may be implemented in a plate-shaft rotation configuration wherein the plate face has a geometry designed to cover a substantial portion of the cross-sectional area of the intake passage when aligned perpendicularly to stream flow, called the fully closed position. In the fully open position the plate may rotate about its shaft such that the width of the plate and shaft obstruct the air passage, allowing substantially more air to pass through. The rotating shafts are generally located through an axis of symmetry on the plate's face or at an edge of the plate adjacent to one wall of the passage. The shape of the CMCV may be similar to a throttle device used to direct air charge into the intake manifold. CMCV's are commonly located downstream of the throttle device in individual runners coupling the intake manifold to individual cylinders.

The disclosed systems and methods relate to the design and operation of an intake system of an internal combustion engine that may be included in the propulsion system of an automobile. Specifically, intake systems that utilize charge motion control for purposes that may include inducing turbulence within a combustion chamber to homogenize the fuel-to-air distribution. Further, the leading edge of the ignition flame passing through the chamber may be accelerated by this additional motion so that combustion occurs more rapidly and power can be delivered to the crank shaft at the desired point in the power stroke. By restricting a portion of the intake passageway, air is forced into a direction perpendicular to the direction of flow so that when the air charge enters the chamber it has velocity components in the flow direction as well as the plane orthogonal to the flow direction. In a different example, to produce more tumbling motion, the charge motion control valve can block the bottom portion of the intake flow to produce a high velocity flow on the top part of intake port in the same direction as the flow. As such, the flow enters the combustion chamber along the top part of the intake valve and results in increased tumble motion. Charge motion control valves (i.e., devices) may be placed in engine systems to vary engine performance in the aforementioned ways.

FIG. 1 schematically shows aspects of an example engine system 100 including an engine 10 with four cylinders (labeled 1-4). As elaborated herein, the four cylinders are arranged as a first cylinder group 17 consisting of non-dedicated EGR cylinders 1-3 and a second cylinder group 18 consisting of dedicated EGR cylinder 4. A detailed description of each combustion chamber of engine 10 is provided with reference to FIG. 2. Engine system 100 may be coupled in a vehicle, such as a passenger vehicle configured for road travel.

In the depicted embodiment, engine 10 is a boosted engine coupled to a turbocharger 13 including a compressor 74 driven by a turbine 76. Specifically, fresh air is introduced along intake passage 42 into engine 10 via air cleaner 53, then travels through compressor 74, and subsequently flows to charge-air cooler 78. A flow rate of ambient air that enters the intake system through intake air passage 42 can be controlled at least in part by adjusting intake throttle 20. Compressor 74 may be any suitable intake-air compressor, such as a motor-driven or driveshaft driven supercharger compressor. In engine system 10, however, the compressor is a turbocharger compressor mechanically coupled to turbine 76 via a shaft 19, and the turbine 76 is driven by expanding engine exhaust. In one embodiment, the compressor 74 and turbine 76 may be coupled within a twin scroll turbocharger. In another embodiment, the turbocharger 13 may be a variable geometry turbocharger (VGT), where turbine geometry is actively varied as a function of engine speed.

As shown in FIG. 1, compressor 74 is coupled, through charge-air cooler 78, to intake throttle 20. Intake throttle 20 is coupled to engine intake manifold 25. From the compressor 74, the compressed air charge flows through the charge-air cooler 78 and the throttle valve 20 to the intake manifold 25. The charge-air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 74. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 25 is coupled to a series of combustion chambers 30 through a series of intake valves (see FIG. 2). The combustion chambers are further coupled to exhaust manifold 36 via a series of exhaust valves (see FIG. 2). In the depicted embodiment, exhaust manifold 36 includes a plurality of exhaust manifold sections to enable effluent (i.e., exhaust) from different combustion chambers to be directed to different locations in the engine system. In particular, effluent from the first cylinder group 17 (cylinders 1-3) is directed through turbine 76 of exhaust manifold 36 before being processed by an exhaust catalyst of emission control device 170. Exhaust from the second cylinder group 18 (cylinder 4), in comparison, is routed back to intake manifold 25 via passage 50 and exhaust catalyst 70. Alternatively, at least a portion of exhaust from the second cylinder group 18 is directed to turbine 76 of exhaust manifold 36 via valve 65 and passage 56. By adjusting valve 65, a portion of exhaust directed from cylinder 4 to the exhaust manifold relative to the intake manifold may be varied. In some examples, valve 65 and passage 56 may be omitted.

In some embodiments, exhaust catalyst 70 may be configured as a water gas shift (WGS) catalyst. WGS catalyst 70 is configured to generate hydrogen gas from rich exhaust gas received in passage 50 from cylinder 4.

Each of cylinders 1-4 may include internal EGR by trapping exhaust gases from a combustion event in the respective cylinder and allowing the exhaust gases to remain in the respective cylinder during a subsequent combustion event. The amount of internal EGR may be varied via adjusting intake and/or exhaust valve opening and/or closing times. For example, by increasing intake and exhaust valve overlap, additional EGR may be retained in the cylinder during a subsequent combustion event. External EGR is provided to cylinders 1-4 solely via exhaust flow from the second cylinder group 18 (herein, cylinder 4) and EGR passage 50. In another example, external EGR may only be provided to cylinders 1-3 and not to cylinder 4. Furthermore, external EGR is not provided by exhaust flow from cylinders 1-3. Thus, in this example, cylinder 4 is the sole source of external EGR for engine 10 and therefore is also referred to herein as the dedicated EGR cylinder (or dedicated cylinder group). By recirculating exhaust from one cylinder of the four-cylinder engine to the engine intake manifold, a nearly constant (e.g., around 25% in the present example) EGR rate can be provided. Cylinders 1-3 are also referred to herein as the non-dedicated EGR cylinders (or non-dedicated cylinder group). While the current example shows the dedicated EGR cylinder group as having a single cylinder, it will be appreciated that in alternate engine configurations, the dedicated EGR cylinder group may have more engine cylinders.

EGR passage 50 may include an EGR cooler 54 for cooling EGR delivered to the engine intake. In addition, EGR passage 50 may include a first exhaust gas sensor 51 for estimating an air-fuel ratio of the exhaust recirculated from the second cylinder group 18 to the remaining engine cylinders. A second exhaust gas sensor 52 may be positioned downstream of the exhaust manifold sections of the first cylinder group 17 for estimating an air-fuel ratio of exhaust in the first cylinder group. Still further exhaust gas sensors may be included in the engine system of FIG. 1.

A hydrogen concentration in external EGR from cylinder 4 may be increased via enriching an air-fuel mixture combusted in cylinder 4. In particular, the amount of hydrogen gas generated at WGS catalyst 70 may be increased by increasing the degree of richness of exhaust received in passage 50 from cylinder 4. Thus, to provide hydrogen enriched exhaust to engine cylinders 1-4, fueling of the second cylinder group 18 may be adjusted so that cylinder 4 is enriched. In one example, the hydrogen concentration of the external EGR from cylinder 4 may be increased during conditions when engine combustion stability is less than desired. This action increases hydrogen concentration in external EGR and it may improve engine combustion stability, especially at lower engine speeds and loads (e.g., idle). In addition, the hydrogen enriched EGR allows much higher levels of EGR to be tolerated in the engine, as compared to conventional (lower hydrogen concentration) EGR, before encountering any combustion stability issues. By increasing the range and amount of EGR usage, engine fuel economy is improved.

Combustion chambers 30 may be supplied with one or more fuels, such as gasoline, alcohol fuel blends, diesel, biodiesel, compressed natural gas, etc. Fuel may be supplied to the combustion chambers via injector 66, which may draw fuel from fuel tank 26. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

A number of charge motion control devices (CMCD) 27 are placed in the intake manifold 25, with each CMCD corresponding to one of cylinders 1-4. As seen in FIG. 1, intake manifold 25 splits into individual, discrete paths corresponding to individual cylinders 1-4. Inside each of the discrete paths a CMCD 27 is positioned to manipulate airflow into the corresponding cylinder. In other embodiments, cylinders 1-4 may have multiple intake paths (i.e., branches) such that each cylinder is in fluidic communication with multiple CMCD's 27. In the present embodiment, each of cylinders 1-4 is fluidically coupled to a single CMCD 27. In some embodiments, the charge motion control devices 27 may include valves, such as shown in FIG. 1, in which case the devices may be equivalently referred to as charge motion control valves (CMCV) 27.

The general purpose of the CMCV's 27 may be to restrict airflow to one or more of cylinders 1-4 for a variety of desired results, including but not limited to adjusting tumble ratio (i.e., turbulence) and burn rate. In the current example of FIG. 1, each CMCV 27 includes a valve plate. Note that for the purposes of this disclosure the CMCV is in the "closed" position when it is fully activated and the valve plate fully tilted into the respective conduit of intake manifold 25, thereby resulting in maximum air charge flow obstruction. Alternatively, the valve is in the "open" position when deactivated and the valve plate is fully rotated to lie parallel with airflow, thereby substantially minimizing or eliminating airflow charge obstruction. In other words, each CMCV 27 may utilize a rotating shaft within the intake path to rotate the plate so that it is parallel to the flow direction. In other embodiments, the valve (plate) of each CMCV 27 may be integrated into the branches of intake manifold 25 such that airflow restriction is caused by end-pivoting CMCV 27 into the airflow during the closed position. Alternatively, in this configuration, when the CMCV 27 is in the open position the plate lies along the contour of the branch such that substantially no obstruction is present in the airflow. Other configurations of CMCV 27 are possible while remaining within the scope of the present disclosure.

Exhaust from exhaust manifold 36 is directed to turbine 76 to drive the turbine. When reduced turbine torque is desired, some exhaust may be directed instead through a wastegate (not shown), by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NO from the exhaust flow when the exhaust flow is lean, and to reduce the trapped NO when the exhaust flow is rich. In other examples, an exhaust after-treatment catalyst may be configured to disproportionate NO or to selectively reduce NO with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow. All or part of the treated exhaust from emission control device 170 may be released into the atmosphere via exhaust conduit 35.

Engine system 100 further includes a control system 14. Control system 14 includes a controller 12, which may be any electronic control system of the engine system or of the vehicle in which the engine system is installed. Controller 12 may be configured to make control decisions based at least partly on input from one or more sensors 16 within the engine system, and may control actuators 81 based on the control decisions. For example, controller 12 may store computer-readable instructions in memory, and actuators 81 may be controlled via execution of the instructions. Example sensors include MAP sensor 24, MAF sensor 55, exhaust gas temperature and pressure sensors 128 and 129, and exhaust gas oxygen sensors 51, 52, and crankcase ventilation pressure sensor 62. Example actuators include throttle 20, fuel injector 66, charge motion control devices 27, dedicated cylinder group valve 65, etc. Additional sensors and actuators may be included, as described in FIG. 2. Storage medium read-only memory in controller 12 can be programmed with computer readable data representing instructions executable by a processor for performing the methods described below, as well as other variants that are anticipated but not specifically listed. Example methods and routines are described herein with reference to FIGS. 3-7.

Control system 14 with controller 12 may include computer-readable instructions for controlling actuators 81, in particular CMCV's 27. For example, actuation (i.e., opening and closing) of CMCV's 27 may be a function of engine speed and load, wherein load is a function of factors such as intake manifold pressure (MAP), atmospheric pressure, and temperature, among others. In other examples, actuation of CMCV's 27 may be responsive to actuation of throttle 20 and may be used within the control system to monitor engine load. In one example, the CMCV 27 may be actuated by a first amount in response to an indicated throttle 20 position and may be actuated a second amount in response to an indicated MAP. The first and second amount may be the same direction or in opposing directions with respect to degree of rotation of the plate of CMCV 27. Further, the CMCV 27 may fully open if an indicated throttle position is at a predetermined threshold or if MAP is at a pre-determined threshold. Alternately, the control system 14 may have instructions to close and/or open CMCV 27 in response to a function of both variables. Valve actuation may be further responsive to temperature, ignition timing, or other conditions not otherwise specified.

In another example operating scheme, control system 14 may have instructions to actuate any of CMCV's 27 via actuators 81 responsive to input from sensors 16. Input information may include the temperature within the engine or exhaust system so that the CMCV 27 may be closed if engine conditions fall under a temperature threshold thus inducing turbulence in cold starts. Turbulence within combustion chambers allows for more effective burning, this may be advantageous in cold start situations where losses in combustion efficiency may be pronounced. Embodiments may also actuate CMCV 27 to a pre-determined position corresponding to a sensed temperature or other engine load indications. In some examples, actuators 81 may fully open the CMCV 27 such that the valve plate lies parallel with the airflow upon sensors 16 indicating that a load threshold is met as determined by control system 14. Full opening of the valve plate parallel with the airflow and intake manifold branch substantially removes passage obstruction so that maximum air charge can enter the combustion chambers of cylinders 1-4, providing maximum horsepower.

Referring to FIG. 2, one cylinder of internal combustion engine 10, comprising a plurality of cylinders as shown in FIG. 1, is shown. Engine 10 includes combustion chamber 30 and cylinder walls 132 with piston 136 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 144 and exhaust manifold 148 via respective intake valve 152 and exhaust valve 154. Each intake and exhaust valve may be operated independently by an intake cam 151 and an exhaust cam 153. Intake valve adjuster 85 advances or retards the phase of intake valve 152 relative to a position of crankshaft 40. Additionally, intake valve adjuster 85 may increase or decrease an intake valve lift amount. Exhaust valve adjuster 83 advances or retards the phase of exhaust valve 154 relative to a position of crankshaft 40. Further, exhaust valve adjuster 83 may increase or decrease an exhaust valve lift amount. A charge motion control device (e.g., valve) 133 is placed within intake manifold 144 in between the intake valve 152 and an electronic throttle 162 described below in more detail. CMCD 133 may be similar to or substantially the same as CMCV's 27 of FIG. 1.

The position of intake cam 151 may be determined by intake cam sensor 155. The position of exhaust cam 153 may be determined by exhaust cam sensor 157. In cases where combustion chamber 30 is part of a dedicated EGR cylinder, the timing and/or lift amount of valves 152 and 154 may be adjusted independently of other engine cylinders so that the cylinder air charge of the dedicated EGR cylinder may be increased or decreased relative to other engine cylinders. In this way, external EGR supplied to engine cylinders may exceed twenty five percent of the cylinder charge mass. External EGR is exhaust that is pumped out of exhaust valves of a cylinder and returned to cylinders via cylinder intake valves. Further, the internal EGR amount of cylinders other than the EGR cylinder may be adjusted independently of the dedicated EGR cylinder by adjusting valve timing of those respective cylinders. Internal EGR is exhaust that remains in a cylinder after a combustion event and is part of a mixture in the cylinder for a subsequent combustion event.

Fuel injector 66 is shown positioned to inject fuel directly into cylinder 30, which is known to those skilled in the art as direct injection. Alternatively, fuel may be injected to an intake port, which is known to those skilled in the art as port injection. In some example engine configurations, one or more engine cylinders may receive fuel from both direct and port fuel injectors.

In one example, fuel injector 66 may be a selectively deactivatable fuel injector. Thus, an engine cylinder may be selectively deactivated by turning off fuel to the given cylinder. In the context of the dedicated EGR cylinder (cylinder 4 of FIG. 1), injector 66 fueling the EGR cylinder may be deactivated during selected conditions when EGR demand is low so as to allow for a rapid drop in external EGR from the dedicated cylinder. These may include, for example, conditions when engine load is low (e.g., lower than a threshold load), during an engine cold-start, or during a catalyst warm-up condition.

In some embodiments, the dedicated EGR cylinder may be selectively deactivated by shutting off air instead of, or in addition to, shutting off fuel. For example, either the intake valves or the exhaust valves of the dedicated EGR cylinder may be deactivated. By deactivating either the intake valves or the exhaust valves, the pumping work of the cylinder may be increased, which may be desired during catalyst warm-up. Maximizing pumping work of the dedicated EGR cylinder may also include adjusting cam phasing, valve lift, the position of a port throttle, or a charge motion control device, etc. Alternatively, all valves of the dedicated EGR cylinder may be deactivated when it is desired to reduce EGR without increasing pumping work, for example at low engine loads after the catalyst is warmed up.

Intake manifold 144 is shown communicating with optional electronic throttle 162 which adjusts a position of throttle plate 164 to control air flow from air intake 42 to intake manifold 144. In some examples, throttle 162 and throttle plate 164 may be positioned between intake valve 152 and intake manifold 144 such that throttle 162 is a port throttle. Driver demand torque may be determined from a position of accelerator pedal 180 as sensed by accelerator pedal sensor 184. A voltage or current indicative of driver demand torque is output from accelerator pedal sensor 184 when driver's foot 182 operates accelerator pedal 180.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 148 upstream of catalytic converter 170. Alternatively, a two-state exhaust gas oxygen sensor may be substituted for UEGO sensor 126.

Converter 170 can include multiple catalyst bricks, in one example. In another example, multiple emission control devices, each with multiple bricks, can be used. Converter 170 can be a three-way type catalyst in one example.

Controller 12 is shown in FIG. 2 as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 113; a measurement of engine manifold pressure (MAP) from pressure sensor 122 coupled to intake manifold 44; an engine position sensor from a Hall effect sensor 115 sensing crankshaft 40 position; a measurement of air mass entering the engine from sensor 119; and a measurement of throttle position from sensor 158. Barometric pressure may also be sensed (sensor not shown) for processing by controller 12. In a preferred aspect of the present description, engine position sensor 115 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 136 moves to the bottom of the cylinder so as to increase the volume within combustion chamber 30. The position at which piston 136 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 136 moves toward the cylinder head so as to compress the air within combustion chamber 30. The point at which piston 136 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 136 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

Thus the components of FIGS. 1-2 provide for an engine system, comprising: a first cylinder group routing exhaust to an exhaust passage; a second cylinder group routing exhaust directly from the second cylinder group to an intake manifold of the engine; a first set of charge motion control devices coupled to cylinders of the first cylinder group; a second set of charge motion control devices coupled to cylinders of the second cylinder group; and a controller with computer readable instructions for adjusting each of the first set of charge motion control devices and the second set of charge motion control devices to vary a charge motion level between the first cylinder group and the second cylinder group while recirculating exhaust from only the second cylinder group to the intake manifold, the adjusting each of the first and second set of charge motion control devices based on engine load and air-fuel ratio of the second cylinder group. Other example operation schemes are possible that are described in more detail herein.

In one example with the above engine system, the first set of charge motion control devices and the second set of charge motion control devices include charge motion control valves coupled to an intake of each cylinder of the first and second cylinder groups. Furthermore, the first and second sets of charge motion control devices and their respective charge motion control valves are spaced apart along intake runners coupling the intake manifold to the first and second cylinder groups. Additionally, the second cylinder group is fluidically coupled to a dedicated exhaust gas recirculation system comprising one or more passages, one or more control valves, a cooler, and an exhaust catalyst.

FIG. 3 shows an example method 300 for adjusting parameters of a dedicated EGR cylinder group and other engine cylinders (e.g., non-dedicated EGR cylinders) of a multi-cylinder engine based on engine operating conditions. Operating with the dedicated EGR (DEGR) mode on or off may be performed in several ways. In one example, individual exhaust valves of the DEGR cylinder group may route the exhaust to different locations. One exhaust valve may route the exhaust to the intake during the DEGR mode while the second exhaust valve may route the exhaust to the exhaust manifold and turbine during the non-DEGR mode. In another example, to initiate the non-DEGR mode, fueling the DEGR cylinder may be deactivated during certain conditions such that the exhaust produced by the DEGR cylinder (or cylinders) rapidly decreases. In yet another example, the intake and/or exhaust valves of the DEGR cylinder may be deactivated to initiate the non-DEGR mode. In this way, during the DEGR mode one or more dedicated EGR cylinders may route exhaust to an engine intake. During the non-DEGR mode, the one or more dedicated EGR cylinders may route no exhaust to the engine intake.

First, at 302, the routine includes estimating and/or measuring engine operating conditions including, but not limited to, engine speed, load, boost, MAP, intake air flow, and position of charge motion control valves. Furthermore, the engine operating conditions can include ambient conditions such as ambient pressure, temperature, humidity, and catalyst temperature. At 304, it may be determined if non-dedicated EGR mode conditions have been met. As such, the dedicated EGR cylinder group may be activated or deactivated depending on the EGR demand level. In one example, the dedicated EGR cylinder group may be deactivated during an engine warm-up condition which may include one of an engine cold-start and an exhaust catalyst temperature being lower than a threshold. In another example, the dedicated EGR cylinder group providing EGR to the engine intake may be deactivated responsive to engine load. Specifically, the dedicated EGR cylinder(s) may be deactivated responsive to engine load being lower than a threshold load.

If non-dedicated EGR mode conditions are met, then at 306 the routine includes operating in the non-DEGR mode by not flowing exhaust from the DEGR cylinder group to the intake. This may include opening valve 65 of FIG. 1 or a different EGR control valve not depicted in FIG. 1. In other words, second cylinder group 18 (DEGR cylinder 4) intakes and exhausts in substantially the same manner as first cylinder group 17 (non-DEGR cylinders 1-3) without directing exhaust from cylinder 4 into intake manifold 25. In another example, this may include deactivating the DEGR cylinders of the DEGR cylinder group by either deactivating fueling and/or deactivating exhaust valves. In another example, each DEGR cylinder may have a first exhaust valve routing exhaust to an EGR passage and engine intake and a second, different, exhaust valve routing exhaust to the exhaust passage and turbine. During the non-DEGR mode an engine controller may close the first exhaust valve any only operate the second exhaust valve. Further, the method at 306 may also include adjusting an air-fuel ratio of the non-DEGR cylinder group and the DEGR cylinder group to both be stoichiometric.

Next, at 308, the method includes adjusting the charge motion control devices (e.g., valves) of the non-DEGR cylinder group and DEGR group to maintain a common charge motion level between the two cylinder groups, the common charge motion level based on engine load. The method at 308 may further include adjusting the charge motion control devices to achieve a common burn rate while the air-fuel ratio of both the non-DEGR cylinder group and the DEGR cylinder group is stoichiometric (e.g., approximately stoichiometric). Adjusting the charge motion control devices may include, at 326, adjusting a single common actuator based on engine load. The single common actuator may be a device that couples the charge motion control devices of each cylinder together, such as CMCV's 27 corresponding to cylinders 1-4 of FIG. 1. In this way, the charge motion control devices of the DEGR cylinder group and the charge motion control devices of the non-DEGR cylinder group may be linked. In an alternate example, adjusting the charge motion control devices may include, at 328, adjusting actuators coupled to each of the non-DEGR and DEGR cylinder groups to a same charge motion level based on engine load. Instead of utilizing a single common actuator as in step 326, each CMCV 27 may be controlled with a single actuator. In this way, each single actuator is adjusted the same such that each CMCV 27 is angled the same to allow equal amounts of air charge to enter cylinders 1-4. Alternatively, each group of cylinders (e.g., DEGR and non-DEGR) may be controlled with a single actuator. Thus, there may be two actuators controlling the charge motion of each cylinder group separately. In this way, the charge motion control devices of the DEGR cylinder group and the charge motion control device of the non-DEGR cylinder group are un-linked.

Alternatively, if non-dedicated EGR mode conditions are not met at 304, then at 310 the routine includes operating in the DEGR mode by flowing exhaust from the DEGR cylinder group to the intake. This may include closing valve 65 of FIG. 1 or a different EGR control valve not depicted in FIG. 1. In another example, this may include operating an exhaust valve of each cylinder of the DEGR cylinder group that couples each cylinder to an EGR passage routing exhaust to the engine intake (e.g., intake manifold). As such, all or a portion of the exhaust gas expelled from the second cylinder group 18 (DEGR cylinder 4) is sent through passage 50 and directed into intake manifold 25 to be mixed with the fresh air charge and combusted in cylinders 1-4. During the DEGR mode, the non-dedicated cylinders of the non-DEGR cylinder group continue to route exhaust exclusively to the turbine and exhaust passage and not to the intake manifold.

Next, at 312, the method includes adjusting (i.e., varying) the charge motion control devices of the non-DEGR cylinder group and DEGR cylinder group to vary the charge motion level and balance the burn rate between the non-DEGR and DEGR cylinder groups based on engine load and other parameters (e.g., such as air-fuel ratio of the cylinders in the DEGR cylinder group). In other words, while the DEGR mode is activated and exhaust from the DEGR cylinder group (e.g., cylinder 4) is being recirculated into the fresh air charge, the amount of intake air directed to all the engine cylinders (e.g., cylinders 1-4) may vary depending on conditions such as the engine load. In one example, adjusting the charge motion control devices of the two cylinder groups includes, at 330, adjusting a single common actuator based on engine load. The single common actuator may couple the CMCV's 27 of cylinders 1-4 (all the engine cylinders) together such that each CMCV 27 moves in unison with the others. In another example, adjusting the charge motion control devices includes, at 332, adjusting actuators coupled to each of the non-DEGR and DEGR cylinder groups separately based on engine load and the cylinder type. In one example, this may include adjusting each individual actuator separately. In another example, this may include adjusting two actuators, each of the two actuators coupled to the charge motion control devices of one of the DEGR or non-DEGR cylinder groups (e.g., one actuator includes all the CMCD's of a single cylinder group). Multiple operations involving step 332 are possible depending on the desired engine load, several of which are shown in FIG. 4.

As used throughout this disclosure, a burn rate of one of the combustion chambers refers to the time for most of the air/fuel mixture in the chamber to completely burn when the piston is near the top dead center of its stroke. In particular, the burn may finish when about 90% of the air-fuel mixture is burned and the remaining unburned hydrocarbons are expelled in the subsequent exhaust event. In other words, burn rate is the speed at which the fuel releases its energy. Also, as used throughout this disclosure, tumble ratio refers to the degree of charge motion in the cylinder. In particular, tumble ratio may be quantified as a non-dimensional number that describes how fast the air charge flow is rotating in the tumble direction within the combustion chamber. For example, a tumble ratio of 1 may refer to the flow completing one full rotation per piston stroke. As the piston reaches a top dead center position, tumble motion is naturally compressed and converted to turbulence before ignition and increases the burn rate of the air/fuel mixture. Tumble ratio is increased by directing the flow as it passes through the charge motion control device. In particular, as the charge motion control device moves towards a more closed position, tumble ratio is increased, thereby introducing more turbulence in the air as well as increasing fuel mixture in the chamber and increasing the burn rate.

FIG. 3 and other examples below provide a method for an engine, comprising: adjusting each of a first charge motion control device coupled to a first cylinder group and a second charge motion control device coupled to a second cylinder group to vary a charge motion level between the first and second cylinder groups while recirculating exhaust from only the second cylinder group to an intake manifold. With this method, spark timing of the cylinders of the first and second cylinder groups may be adjusted to achieve optimal combustion phasing in all cylinders. Additionally, the charge motion level between the first and second cylinder groups may be based on an air-fuel ratio of cylinders of the second cylinder group (i.e., DEGR cylinders). With this method, adjusting each of the first charge motion control device and the second charge motion control device to vary the charge motion level between the first and second cylinder groups includes adjusting the first charge motion control device with a first actuator and the second charge motion control device with a separate, second actuator. Also, the first charge motion control device includes a charge motion control valve coupled to each cylinder in the first cylinder group and wherein the second charge motion control device includes a charge motion control valve coupled to each cylinder of the second cylinder group.

In one example, adjusting each of the first charge motion control device and the second charge motion control device to vary the charge motion level between the first and second cylinder groups includes adjusting the first and second charge motion control devices together with a single common actuator, the first and second charge motion control devices linked and offset from one another by a set offset resulting in a constant difference in the charge motion level between the first and second cylinder groups. Furthermore, the charge motion level of the first cylinder group is less than the charge motion level of the second cylinder group. Also, first and second charge motion control devices are coupled to the single common actuator on a common shaft, the first charge motion control device positioned on the common shaft with the set offset from the second charge motion control device.

Alternatively, adjusting each of the first charge motion control device and the second charge motion control device to vary the charge motion level between the first and second cylinder groups is responsive to engine load and air-fuel ratio of the first and second cylinder groups, the charge motion level of the second cylinder group increasing with decreasing engine load and increasing variance of the air-fuel ratio from stoichiometry and the charge motion level of the first cylinder group increasing with decreasing engine load. In particular, when the DEGR cylinders are operating with a non-stoichiometric air-fuel ratio (e.g., rich or lean), the burn rate of the DEGR cylinders may be lower than the burn rate of the non-DEGR cylinders. To substantially match the burn rates of the two cylinder groups (DEGR and non-DEGR cylinders), charge motion may be increased to increase the burn rate of the DEGR cylinders. Furthermore, engine load may affect the charge motion required for all cylinders whereas the air-fuel ratio of the DEGR cylinder (second cylinder group) may affect the charge motion difference between the two cylinder groups.

In another example, adjusting each of the first charge motion control device and the second charge motion control device to vary the charge motion level between the first and second cylinder groups includes adjusting each of the first charge motion control device and the second charge motion control device to increase a charge motion level of the second cylinder group while simultaneously increasing engine load in order to decrease an EGR rate of EGR delivered to the intake manifold from the second cylinder group.

In yet another example, the above method further comprises decreasing an air-fuel ratio of the second cylinder group and maintaining an air-fuel ratio of the first cylinder group at stoichiometry while recirculating exhaust from only the second cylinder group to an intake manifold and wherein the adjusting each of the first charge motion control device and the second charge motion control device to vary the charge motion level between the first and second cylinder groups includes adjusting each of the first charge motion control device and the second charge motion control device to increase the charge motion level of the second cylinder group to be greater than the charge motion level of the first cylinder group in order to match a burn rate between the first cylinder group and the second cylinder group.

In another example, adjusting each of the first charge motion control device and the second charge motion control device to vary the charge motion level between the first and second cylinder groups while recirculating exhaust from only the second cylinder group to the intake manifold is during a first, dedicated EGR mode and further comprising, during a second, non-dedicated EGR mode where exhaust from the second cylinder group is not routed to the intake manifold, adjusting the air-fuel ratio of the second cylinder group and the first cylinder group to be stoichiometric and adjusting each of the first and second charge motion control devices to maintain a common charge motion level between the first and second cylinder groups.

FIG. 4 depicts a table 400 showing different situations for controlling the charge motion control devices and EGR of the cylinders depending on the engine load. The situations shown in FIG. 4 may be utilized during step 312 or step 308 and in particular step 332 or 328 of FIG. 3, for example. Referring to table 400, the first column shows the engine load ranging from high and low values. Several thresholds for the engine load are defined herein as an upper threshold greater than a middle threshold that is in turn greater than a lower threshold. The three thresholds for engine load are relative to one another in the context of the present disclosure. The particular value or unit of measurement of engine load may vary depending on the engine, but the three thresholds remain relative to one another.

The second and third columns of table 400 show charge motion and tumble ratio levels of the non-DEGR and DEGR cylinders, respectively. As seen, the tumble ratios range from low, medium, high, and higher, all of which are relative to each other similar to the three engine load threshold described above. Similarly, the range of tumble ratios correspond to the charge motion level. In other words, a high tumble ratio is caused by a high charge motion level. Finally, the fourth column shows if the dedicated-EGR mode is on or off. For example, if the DEGR mode is on, then exhaust gas from the DEGR cylinder group (such as cylinder 4 of FIG. 1) is routed through the EGR system to mix with the intake charge of the intake manifold to flow into the DEGR and non-DEGR cylinders. Alternatively, if the DEGR mode is off, then no exhaust gas from the DEGR cylinder group is routed through the EGR system and to the intake manifold.

A first situation 401 is shown in the first row of table 400. The first situation occurs when the engine load is above the aforementioned upper threshold. In some examples, the engine load above the upper threshold may occur during a tip-in. When the engine is above the upper threshold, a low tumble ratio is desired in the non-DEGR cylinder group, and therefore the charge motion level is adjusted to a low setting. As a result, the CMCD's may be adjusted such that they are not blocking the corresponding cylinder intakes and allow maximal airflow to the engine cylinders. Similarly, a low tumble ratio is also desired in the DEGR cylinder group, and therefore the charge motion level is adjusted to a low setting. Lastly, the DEGR mode may be turned off such that all exhaust is routed through the exhaust manifold to the emission control device and turbine rather than routing a portion back to the intake manifold.

A second situation 402 occurs when the engine load is between the upper and middle thresholds. During the second situation the tumble ratio and charge motion level remain low for the non-DEGR cylinders while the tumble ratio and charge motion level are increased to a medium level for the DEGR cylinders. Thus, during the second situation (or engine load mode) the charge motion level may be greater in the DEGR cylinders than in the non-DEGR cylinders. Furthermore, the DEGR mode is turned on such that a portion of the exhaust (i.e., the exhaust of cylinder 4) is routed upstream to the intake manifold. A third situation 403 occurs when the engine load is between the middle and lower thresholds. During the third situation the tumble ratio and charge motion level are at a medium level for the non-DEGR cylinders while the tumble ratio and charge motion level are increased to a high level for the DEGR cylinders. In this way, the charge motion may be greater in the DEGR cylinders than in the non-DEGR cylinders. The DEGR mode is on for the third situation.

Finally, the fourth situation 404 occurs when the engine load is less than the lower threshold. In one example, engine load below the lower threshold may occur during a tip-out. In another example, engine load below the lower threshold may occur during engine idle conditions. During the fourth situation the tumble ratio and charge motion level are increased to a high level for the non-DEGR cylinders while the tumble ratio and charge motion level are increased to a higher level (higher than the high level) for the DEGR cylinders. In this way, the tumble ratio and charge motion level may be greater for the DEGR cylinders than in the non-DEGR cylinders. Lastly, during the fourth situation, the DEGR mode may be on but with a reduced amount of EGR, which may be implemented via partially closing valve 65 of FIG. 1 or a similar EGR control device. In another example, the DEGR mode may be turned off completely during the fourth situation 404.

In summary, by adjusting the charge motion levels between the first and second cylinder groups, in conjunction or separately, the burn rates of the cylinders are substantially matched (i.e., equal between the cylinders). For example, the DEGR cylinders will have EGR and have a rich air-fuel ratio while the non-DEGR cylinders will have only EGR with a stoichiometric air-fuel ratio. As such, hydrogen is generated for improved dilution tolerance. In some cases, the DEGR cylinders will burn at a different rate than the non-DEGR cylinders unless the burn rate discrepancy is compensated with charge motion control, as described in the above examples.

When adjusting the charge motion levels between the first and second cylinder groups, the effect of the air-fuel ratio may be taken into consideration. In particular, the burn rate may initially increase (i.e., faster burning) for slightly rich air-fuel ratios relative to stoichiometric air-fuel ratios. Then the burn rate will decrease as the air-fuel ratio decreases or gets richer. As such, the charge motion valve can be used to compensate for the changes in burn rate as the air-fuel ratio is adjusted. In some examples, the DEGR cylinders will be run rich such that burn rate will be increased by increasing charge motion in the DEGR cylinders. In other examples, if the DEGR cylinders have EGR and are lean, then charge motion may be increased in order to increase the burn rate in the lean DEGR cylinders to substantially match the burn rate of the non-DEGR cylinders. Other operation methods are possible while remaining within the scope of the present disclosure.

FIG. 5 shows several graphs of variables that fluctuate during engine operation with actuation of the charge motion control devices of DEGR cylinders and non-dedicated EGR cylinders (e.g., cylinders 1-4 shown in FIG. 1). Map 500 depicts the EGR rate as a percentage at plot 510, the air-to-fuel ratio of the non-DEGR cylinders at plot 502, the air-to-fuel ratio of the DEGR cylinders at plot 504, the CMCD positions of the non-DEGR cylinders at plot 512, and CMCD positions of the DEGR cylinders at plot 514. Furthermore, the charge motion level of the DEGR cylinders is shown at plot 524 while the charge motion level of the non-DEGR cylinders is shown at plot 526. Finally, the on and off positions of the DEGR mode is shown at plot 538 while the engine load is shown at plot 544.

Note that the charge motion level plots and CMCD position plots are shown as reciprocals of each other. Specifically, as the CMCD position closes (e.g., covers more of a flow passage to a cylinder), the turbulence and charge motion level of that cylinder increases. Additionally, EGR is supplied exclusively (e.g., only) by the DEGR cylinders as described previously. Furthermore, map 500 shows an example where the CMCD's of the DEGR cylinder group and the CMCD's of the non-DEGR cylinder group are linked (e.g., via a single actuator). For example, a linkage (e.g., common shaft) between the actuators of the two groups may have a set (i.e., constant) offset between the two groups. As a result, the vertical offset 513 between plots 512 and 514 remains substantially the same. Similarly, the vertical offset 525 between plots 524 and 526 remains substantially the same. In this way, the charge motion between the two different cylinder groups may be controlled together but different charge motion levels may result between the two groups. Time is shown along the horizontal axes of all the plots of map 500.

Prior to t1, the engine may be operating with all cylinders combusting and with exhaust being recirculated from the dedicated EGR cylinder (DEGR) to the engine intake so that EGR is provided from the DEGR cylinders to all remaining engine cylinders as well as the DEGR cylinder. Thus, prior to t1, EGR may be provided at a substantially fixed rate (e.g., approximately 25% in an engine with one DEGR cylinder and three non-DEGR cylinders, such as engine 10 of FIG. 1). At time t1, due to a change in engine operating conditions, the engine load is increased as seen in plot 544. In some examples, the increase in engine load corresponds to a tip-in condition. In response to the change in engine load, the CMCD positions of both the non-DEGR and DEGR cylinders increase to another level. More specifically, the opening of the CMCD's of both cylinder groups increases, thereby decreasing the charge motion level in all engine cylinders. However, the charge motion level of the cylinders of the DEGR cylinder group is greater than the charge motion level in the cylinder of the non-DEGR cylinder group. Additionally, the air-fuel ratio of the non-DEGR cylinders remains at about a stoichiometric ratio while the air-fuel ratio of the DEGR cylinders remains at a lower air-fuel ratio (i.e., rich).

Next, at t2, upon a decrease in the engine load, which may also be referred to as engine tip-out, the CMCD positions of the non-DEGR and EGR cylinders also decrease such that the valves of the CMCD's are in more closed positions than the positions between times t1 and t2. At the same time, the charge motion levels increase accordingly as shown by plots 524 and 526. The air-fuel ratios of both cylinder groups as shown by plots 502 and 504 remain substantially constant during this time. Upon another increase in engine load (or tip-in) at t3, the CMCD positions of plots 512 and 514 again increase. Due to the engine load increase at t3 that is larger than the engine load increase at time t1, the increase in CMCD positions (and related charge motion levels) is larger at time t3 than at time t1, as seen in FIG. 5. When such an aggressive tip-in is initiated (e.g., engine load above an upper threshold), the DEGR mode is switched off at time t3 which also corresponds to the EGR rate falling from 25% to 0%. Turning DEGR off may include deactivating the DEGR cylinders or routing exhaust from the DEGR cylinders to the turbine only and not to the intake manifold. From prior to time t1 to time t3, the EGR rate remains at 25% since one cylinder out of four cylinders has the dedicated EGR functionality. In other examples, the EGR rate may vary from 0% to 25% depending on the position of various EGR control valves and how much of the exhaust from the fourth cylinder is allowed to flow downstream through the exhaust system.

From time t1 to t3 and after, the air-fuel ratio of the non-DEGR cylinders of plot 502 remains substantially constant around the stoichiometric air-fuel ratio of plot 503 while the air-fuel ratio of the DEGR cylinders remains at a near-constant rich level. At time t3, when the DEGR mode is switched off, the air-fuel ratio of the non-DEGR cylinders remains at stoichiometric air-fuel ratio 503. Furthermore, at time t3, the air-fuel ratio of the DEGR cylinder also increases to the stoichiometric air-fuel ratio since the exhaust will not be recirculated but instead be routed to the turbine and vehicle exhaust system when the DEGR mode is switched off. The stoichiometric air-fuel ratio 503 occurs when a near-exact amount of air is provided to the combustion chamber to completely burn all of the fuel present in the combustion chamber during a combustion cycle.

FIG. 6 shows a second example of several graphs of variables that fluctuate during engine operation with the actuation of the charge motion control devices. Map 600 depicts the EGR rate as a percentage at plot 610, air-fuel ratio of the non-DEGR cylinders at plot 602, air-fuel ratio of the DEGR cylinders at plot 604, stoichiometric air-fuel ratio at plot 603. As in FIG. 5, map 600 shows an embodiment where the CMCD's of the non-DEGR cylinder group and the DEGR cylinder group are linked and controlled together via a common actuator. Thus, map 600 shows the CMCD position of the non-DEGR cylinders at plot 612, the CMCD position of the DEGR cylinders at plot 614, and a constant vertical offset 613 between plots 612 and 613. Similarly, plot 624 shows the charge motion level of the DEGR cylinders while plot 626 shows the charge motion level of the non-DEGR cylinders. A vertical offset 625 is also present between plots 624 and 626. Lastly, the on/off states of the DEGR mode are shown in plot 638 while the engine load is shown by plot 644. Note that vertical offsets 613 and 625 may be different than the vertical offsets 513 and 525 of FIG. 5. Time is shown along the horizontal axes of all the plots of map 600.

Prior to time t1, the engine load is maintained at a relatively low load while DEGR is in the on mode with a 25% EGR rate (e.g., approximately 25%). Meanwhile, the air-fuel ratio of the non-DEGR cylinders shown in plot 602 remains at the stoichiometric level shown by plot 603 while the air-fuel ratio shown in plot 604 is lower than stoichiometric (i.e., rich). At time t1 a tip-in event causes the engine load to increase, which causes a series of commands to turn off the DEGR mode, thereby decreasing the EGR rate from 25% to substantially 0%. As such, substantially all the exhaust expelled by cylinder 4 of FIG. 1 (or the group of DEGR cylinders in other embodiments) may be directed to the exhaust system along with the exhaust from cylinders 1-3. At the same time the CMCD positions of the non-DEGR and DEGR cylinders (shown in plots 612 and 614) move to more open positions while the charge motion levels decrease. Lastly, the air-fuel ratio of the DEGR cylinders (plot 604) increases (i.e., becomes leaner) to the stoichiometric air-fuel ratio 603.

Next, at t2, when the engine load decreases back to the lower level, the CMCD positions of plots 612 and 614 move towards more closed positions while the charge motion levels of plots 624 and 626 increase. Since the engine load decreases, the DEGR mode turns on (i.e., activates), causing the EGR rate to increase back up to 25%. As such, the DEGR cylinder can be run rich such that the air-fuel ratio decreases. At time t3, the engine load increases to a level in between the engine loads of times t1 and t2. Accordingly, the CMCD positions again increase while the charge motion levels again decrease, while maintaining the vertical offsets 613 and 625, respectively. Furthermore, a lower amount of EGR may be desired during the engine load of time t3, and therefore the EGR rate may be reduced to a value such as 15% by adjusting one or more EGR control valves. In an alternate example, the EGR rate may remain fixed at approximately 25%. Lastly, at time t3, the air-fuel ratio of the DEGR cylinder 604 increases slightly but remains below the stoichiometric air-fuel ratio of plot 603.

FIG. 7 shows a third example of several graphs of variables that fluctuate during engine operation with the actuation of the charge motion control devices. Map 700 depicts the EGR rate as a percentage at plot 710, air-fuel ratio of the non-DEGR cylinders at plot 702, air fuel ratio of the DEGR cylinders at plot 704, stoichiometric air fuel ratio at 703, CMCD position of the non-DEGR cylinders at plot 712, and CMCD position of the DEGR cylinders at plot 714. Additionally, charge motion level of the DEGR cylinders is shown at plot 724, charge motion level of the non-DEGR cylinders is shown at plot 726, DEGR mode is depicted at plot 738, and the engine load is depicted at plot 744. Time is shown along the horizontal axes of all the plots of map 700. It is noted that while the vertical offsets between the CMCD position and charge motion level plots of FIGS. 5 and 6 remain substantially constant, the vertical offsets of the same plots in FIG. 7 (plots 712, 714, 724, and 726) fluctuate between times t1 and t3. This is a result of the CMCD's between the DEGR cylinder group and the non-DEGR cylinder being un-linked. In one example, each CMCD of each individual cylinder is controlled individually. In another example, all of the CMCD's of the DEGR cylinder group are controlled with a first actuator and all of the CMCD's of the non-DEGR cylinder group are controlled with a second actuator, the first and second actuators being individually controlled based on engine load and cylinder type (e.g., dedicated vs. non-dedicated).

Prior to time t1, the engine load is at a higher level. Meanwhile, the CMCD's of the non-DEGR cylinders remain in the open position while the CMCD of the DEGR cylinder remains in the closed position. Correspondingly, the charge motion level of the DEGR cylinder remains at a higher level while the charge motion level of the non-DEGR cylinders remains at a lower level. As a result of the higher engine load while the charge motion level of the DEGR cylinder is at a higher level, the EGR rate may be set to a percentage less than the maximum 25%, such as 15%. Similar to what is shown in FIGS. 5 and 6, the air-fuel ratio of the non-DEGR cylinders shown at plot 702 remain substantially equal to the stoichiometric ratio of plot 703.

At time t1, the engine load decreases to a lower level than the level prior to time t1. In response to the decrease in engine load, the CMCD position of the non-DEGR cylinders moves closer to the closed position while the charge motion level of the non-DEGR cylinders correspondingly increases. Furthermore, the EGR rate increases up to the maximum level of 25%. Lastly, the air-fuel ratio of the DEGR cylinder is richer than the stoichiometric level and remains about constant between times t1 and t2.

Next, at time t2, the engine load of plot 744 increases to an intermediate level in between the engine load prior to time t1 and at time t1. At the same time, the DEGR is switched off as seen in plot 710, where the EGR rate drops to about 0%. Due to the shutoff of the DEGR mode seen in plot 738, the air-fuel ratio of the DEGR cylinder of plot 704 increases to stoichiometric between times t2 and t3. As such, in response to the change in EGR rate, the CMCD position of the non-DEGR cylinders of plot 712 decreases to substantially match the CMCD position of the DEGR cylinder of plot 714. Additionally, the CMCD position of the DEGR cylinder may open to a more opened position to reduce the charge motion level in the DEGR cylinder of plot 724 since the cylinder is operating at stoichiometric without dilution. As such, the CMCD position and charge motion levels of both the non-DEGR and DEGR cylinders are substantially equal between times t2 and t3. This is a result of the un-linked actuators described above. In one example, in response to a command to eliminate EGR (e.g., in response to a lower desired EGR rate), an engine controller may simultaneously increase engine load and decrease the charge motion level (or maintain the charge motion level) of the DEGR cylinder.

At time t3, the engine load again increases to a higher level, causing a similar increase in CMCD position of the non-DEGR cylinders. In response, the DEGR mode is again activated and the EGR rate at 710 increases to an elevated level less than the maximum level of 25%. Also, the charge motion level of the non-DEGR cylinders decreases while the EGR rate again increases. This may provide the advantage of increasing the relatively constant EGR rate of the DEGR cylinder by adjusting engine operation. While the air-fuel ratio of the non-DEGR cylinders remains near the stoichiometric level, the air-fuel ratio of the DEGR cylinder decreases again in response to the DEGR being switched back on. Furthermore, the DEGR mode shown in plot 738 switches to the on setting since the EGR rate of plot 710 increases above 0%

As shown in FIGS. 5-7, a method for an engine may comprise: during a first condition, when operating in a non-dedicated EGR mode where no exhaust is recirculated to an intake manifold from a first cylinder group or a second cylinder group, adjusting a first charge motion control device coupled to the first cylinder group and a second charge motion control device coupled to a second cylinder group to maintain a common charge motion level between the first and second cylinder groups; and during a second condition, when operating in a dedicated EGR mode where exhaust is recirculated from only the second cylinder group to the intake manifold, adjusting the first charge motion control device and the second charge motion control device to vary the charge motion level between the first and second cylinder groups. In some embodiments this method may substantially match the burn rate between the first and cylinder groups since charge motion is increased in the slower burning cylinder (the DEGR cylinder). In this method, the first condition includes one or more of a cold start, engine warm-up period, or engine load over an upper threshold level and wherein the second condition includes when engine load is between a lower threshold level and the upper threshold level.

In some examples, the above method further comprises during the second condition, maintaining an air-fuel ratio of the first cylinder group at stoichiometry and decreasing an air-fuel ratio of the second cylinder group below stoichiometry and wherein adjusting the first charge motion control device and the second charge motion control device during the second condition includes adjusting the first charge motion control device to a first level and the second charge motion control device to a second level, the first level lower than the second level, wherein the first level and the second level increase with decreasing engine load and wherein the second level further increases with decreasing air-fuel ratio of the second cylinder group. In this example, a difference between the first level and the second level is constant at all operating conditions, the difference based on a set offset between the first charge motion control device and the second charge motion control device, the first and second charge motion control devices controlled with a single common actuator.

Furthermore, a difference between the first level and the second level is variable based on engine load and air-fuel ratio of the second cylinder group and wherein adjusting the first charge motion control device and the second charge motion control device to vary the charge motion level between the first and second cylinder groups includes adjusting a first actuator coupled to the first charge motion control device and a second actuator, separate from the first actuator, coupled to the second charge motion control device. In particular, as the air-fuel ratio of the DEGR cylinder (second cylinder group) deviates further from the stoichiometric air-fuel ratio, the charge motion level may be increased in order to substantially match the burn rate of the non-DEGR cylinders.

In other examples, the above method further comprises responsive to a tip-in over a threshold, switching from the dedicated EGR mode to the non-dedicated EGR mode by disabling one or more of an intake or exhaust valve of each cylinder of the second cylinder group and wherein adjusting the first charge motion control device and the second charge motion control device during both the first condition and the second condition includes adjusting the first charge motion control device and the second charge motion control device to maintain a common burn rate between the first cylinder group and the second cylinder group.

In another example method, a different amount of internal residual between the DEGR and non-DEGR cylinders may exist. As such, if more total residual or higher internal residual is present in the DEGR cylinders than in the non-DEGR cylinders, then the charge motion may be increased to improve the burn rate across the cylinders. It is noted that the above methods of adjusting the first and second charge motion levels as well the DEGR mode are specific examples of a more general case where increased dilution in the DEGR cylinders (via external EGR, internal EGR, lean air-fuel ratio, or rich air-fuel ratio) slows combustion and the positions of the CMCV's should be adjusted (e.g., closed) to compensate.

In this way, the above proposed methods for operating charge motion control devices located upstream of the respective cylinders combined with the dedicated EGR system allows for increased thermal efficiency as well as the ability to transition in and out of the dedicated EGR mode more robustly. In particular, with actuation of the charge motion control devices (valves), transitioning between on and off states of the dedicated EGR mode may provide for smoother engine operation. Furthermore, individually controlling charge motion control devices on dedicated and non-dedicated EGR cylinder groups achieves the technical effect of increasing charge motion control for dedicated and non-dedicated EGR cylinders at different engine load conditions, adjusting an EGR rate provided by dedicated EGR cylinders, and therefore allowing for more versatile engine operation that is conducive to a larger range of engine demands. As such, fuel economy may be increased as well as reducing overall vehicle emissions.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
adjusting a first charge motion control device coupled to a first cylinder group and a second charge motion control device coupled to a second cylinder group to increase a charge motion level of the first and second cylinder groups with decreasing engine load, the first cylinder group charge motion level increased to a charge motion level less than the second cylinder group charge motion level.

2. The method of claim 1, wherein adjusting the first charge motion control device and the second charge motion control device includes adjusting the first and second charge motion control devices together with a single common actuator, the first and second charge motion control devices linked and offset from one another by a set offset resulting in a constant difference in the charge motion level between the first and second cylinder groups.

3. The method of claim 2, wherein the first and second charge motion control devices are coupled to the single common actuator on a common shaft, the first charge motion control device positioned on the common shaft with the set offset from the second charge motion control device.

4. The method of claim 1, wherein adjusting the first charge motion control device and the second charge motion control device includes adjusting the first charge motion control device with a first actuator and the second charge motion control device with a separate, second actuator.

5. The method of claim 1, wherein the adjusting the first charge motion control device and the second charge motion control device is further responsive to an air fuel ratio of the first and second cylinder groups, the charge motion level of the second cylinder group increasing with decreasing engine load and increasing variance of the air-fuel ratio from stoichiometry, and the charge motion level of the first cylinder group increasing with decreasing engine load.

6. The method of claim 1, wherein the adjusting the first charge motion control device and the second charge motion control device includes adjusting each of the first charge motion control device and the second charge motion control device to increase the charge motion level of the second cylinder group while simultaneously increasing engine load in order to decrease an EGR rate of EGR delivered to an intake manifold from the second cylinder group.

7. The method of claim 1, further comprising decreasing an air-fuel ratio of the second cylinder group and maintaining an air-fuel ratio of the first cylinder group at stoichiometry while recirculating exhaust from only the second cylinder group to an intake manifold and wherein the adjusting the first charge motion control device and the second charge motion control device includes adjusting each of the first charge motion control device and the second charge motion control device to increase the charge motion level of the second cylinder group to be greater than the charge motion level of the first cylinder group in order to match a burn rate between the first cylinder group and the second cylinder group.

8. The method of claim 1, further comprising adjusting each of the first charge motion control device and the second charge motion control device to vary the charge motion level between the first and second cylinder groups while recirculating exhaust from only the second cylinder group to an intake manifold during a dedicated EGR mode.

9. The method of claim 1, wherein the first charge motion control device includes a charge motion control valve coupled to each cylinder in the first cylinder group and wherein the second charge motion control device includes a charge motion control valve coupled to each cylinder of the second cylinder group.

10. A method for an engine, comprising:
during a first condition, when operating in a non-dedicated EGR mode where no exhaust is recirculated to an intake manifold from a first cylinder group or a second cylinder group, adjusting a first charge motion control device coupled to the first cylinder group and a second charge motion control device coupled to a second cylinder group to maintain a common charge motion level between the first and second cylinder groups; and
during a second condition, when operating in a dedicated EGR mode where exhaust is recirculated from only the second cylinder group to the intake manifold, adjusting the first charge motion control device and the second charge motion control device to vary the charge motion level between the first and second cylinder groups, wherein the first condition includes one or more of a cold start, engine warm-up period, or engine load over an upper threshold level and wherein the second condition includes when engine load is between a lower threshold level and the upper threshold level.

11. The method of claim 10, further comprising, during the second condition, maintaining an air-fuel ratio of the first cylinder group at stoichiometry and decreasing an air-fuel ratio of the second cylinder group below stoichiometry and wherein adjusting the first charge motion control device and the second charge motion control device during the second condition includes adjusting the first charge motion control device to a first level and the second charge motion control device to a second level, the first level lower than the second level, wherein the first level and the second level increase with decreasing engine load and wherein the second level further increases with decreasing air-fuel ratio of the second cylinder group.

12. The method of claim 11, wherein a difference between the first level and the second level is constant at all operating conditions, the difference based on a set offset between the first charge motion control device and the second charge motion control device, the first and second charge motion control devices controlled with a single common actuator.

13. The method of claim 11, wherein a difference between the first level and the second level is variable based on engine load and air-fuel ratio of the second cylinder group and wherein adjusting the first charge motion control device and the second charge motion control device to vary the charge motion level between the first and second cylinder groups includes adjusting a first actuator coupled to the first charge motion control device and a second actuator, separate from the first actuator, coupled to the second charge motion control device.

14. The method of claim 10, further comprising responsive to a tip-in over a threshold, switching from the dedicated EGR mode to the non-dedicated EGR mode by disabling one or more of an intake or exhaust valve of each cylinder of the second cylinder group and wherein adjusting the first charge motion control device and the second charge motion control device during both the first condition and the second condition includes adjusting the first charge motion control device and the second charge motion control device to maintain a common burn rate between the first cylinder group and the second cylinder group.

15. An engine system, comprising:
a first cylinder group routing exhaust to an exhaust passage;
a second cylinder group routing exhaust directly from the second cylinder group to an intake manifold of the engine;
a first set of charge motion control devices coupled to cylinders of the first cylinder group;
a second set of charge motion control devices coupled to cylinders of the second cylinder group; and
a controller with computer readable instructions for adjusting each of the first set of charge motion control devices and the second set of charge motion control devices to vary a charge motion level between the first cylinder group and the second cylinder group while recirculating exhaust from only the second cylinder group to the intake manifold, the adjusting each of the first and second set of charge motion control devices based on engine load and air-fuel ratio of the second cylinder group.

16. The system of claim 15, wherein the first set of charge motion control devices and the second set of charge motion control devices include charge motion control valves coupled to an intake of each cylinder of the first and second cylinder groups.

17. The system of claim 16, wherein the first and second sets of charge motion control devices and their respective charge motion control valves are spaced apart along intake runners coupling the intake manifold to the first and second cylinder groups.

18. The system of claim 15, wherein the second cylinder group is fluidically coupled to a dedicated exhaust gas recirculation system comprising one or more passages, one or more control valves, a cooler, and an exhaust catalyst.

* * * * *